United States Patent [19]

Hoshino et al.

[11] 4,110,797
[45] Aug. 29, 1978

[54] MAGNETIC RECORDING REPRODUCING APPARATUS WITH FIELD GENERATING MEANS WITHIN THE COPY MEDIUM

[75] Inventors: Yasushi Hoshino, c/o Tokyo Jiki Insatsu Kabushiki Kaisha 5-1, Taito 1-chome, Taito-ku, Tokyo, Japan; Mamoru Namikawa, Machida, Japan

[73] Assignees: Tokyo Jiki InsatsuKabushiki Kaisha; Yasushi Hoshino, both of Tokyo, Japan, part interest to each

[21] Appl. No.: 788,709

[22] Filed: Apr. 19, 1977

[30] Foreign Application Priority Data

Apr. 23, 1976 [JP] Japan ................................. 51-45409

[51] Int. Cl.² .............................................. G11B 5/86
[52] U.S. Cl. ..................................................... 360/17
[58] Field of Search ........................... 360/17, 16, 118; 346/74.1

[56] References Cited

U.S. PATENT DOCUMENTS

| 3,277,244 | 10/1966 | Frost ........................................ 360/17 |
| 3,566,786 | 3/1971 | Kaufer et al. ......................... 346/74.1 |
| 3,617,648 | 11/1971 | Irving et al. ............................ 360/17 |
| 3,869,711 | 3/1975 | Bernard et al. ......................... 360/17 |

*Primary Examiner*—John H. Wolff
*Attorney, Agent, or Firm*—Seidel, Gonda & Goldhammer

[57] ABSTRACT

Informations recorded in a master medium are first magnetically transferred to a temporary copy medium. The transferred informations are repeatedly reproduced with at least one reproducing magnetic head. The feature of the invention resides in the magnetic transfer means wherein the magnetic transfer field is generated from mechanically rotating or oscillating permanent magnet means.

10 Claims, 5 Drawing Figures

MAGNETIC RECORDING REPRODUCING APPARATUS WITH FIELD GENERATING MEANS WITHIN THE COPY MEDIUM

BACKGROUND OF THE INVENTION

The present invention relates to a magnetic recording reproducing apparatus and, more particularly, relates to a magnetic recording reproducing apparatus adapted to repeatedly reproduce or read out recorded informations or signals from magnetic tapes or cards.

Heretofore, magnetic recording medium has been widely used as an economical and effective medium for storing informations or signals in the form of tape, disc, card or sheet in various fields including education, entertainment, office labor saving, data storage and the like.

The present invention relates, particularly, to a magnetic tape or card reproducing apparatus of the type wherein the informations or signals in a magnetically recorded tape or card (hereinafter called "master medium") are once magnetically transferred to a unrecorded temporary magnetic medium (hereinafter called "copy medium") by the contact type magnetic transfer method (this is also called "magnetic printing" in the art) and then the transferred informations are repeatedly reproduced from the copy medium with a conventional magnetic reproducing head. As is well known in the art, the contact type magnetic transfer is characterized in that a master medium provided with a magnetic recording surface having a coersive force greater than that of a copy medium is superposed on the copy medium with their magnetic recording surfaces contacting each other and an A-C magnetic field is applied to the contact area of these media. The magnetic field is gradually reduced from a maximum value at which the magnetic recording surface of the copy medium is magnetically saturated or nearly saturated but the recorded signal of the master medium is not substantially effected, so that the hysteresis loop of the copy medium is gradually shifted to minor loops under the influence of the magnetic field of the master medium. It is also well known that the quality of the thusly transferred signals or informations is high.

It has already been proposed to obtain the necessary magnetic field for the transfer or printing by using an AC electromagnet energized from an AC current source. Advantages resulting from the magnetic transfer or printing are that (1) the original signals such as sound signals or image signals recorded on the master medium are not adversely affected nor erased and (2) the signals of the master medium which have been transferred to the copy medium can be repeatedly reproduced. These advantages are important particularly in the field of language training because of the capability of repetitive reproduction of the same sounds of the master medium. For example, in the case where the master medium is in the form of a card having one or more short length of magnetically recorded tracks and the copy medium is in the form of a short length of an endless tape (though the copy medium need not form an endless loop so long as any given point of the copy medium repeatedly arrives at the same reproducing head), the same sounds transferred to the copy medium can be reproduced periodically or repeatedly so long as the copy medium is being driven. In another example, image signals recorded in a master medium can be repeatedly reproduced on a Braun screen from a copy medium which has signals transferred from the master medium. Further, by recording a computer program on a master medium in the form of a card, the same program can be repeatedly produced and applied to input terminals of a computer. Further example would be found in the facsimile field wherein an incoming facsimile image is once recorded on a master medium and then magnetically transferred to an endless copy medium which is then inked with magnetic toners and finally transferred to sheets of paper several times. Thus, the system of this type is effectively utilized in education, entertainment, man power saving and the like.

However, the conventional magnetic recording reproducing apparatus provided with a magnetic transfer arrangement utilizing an AC current source required an electromagnet, an energizing circuit for the electromagnet and an AC current source. For example, a separate oscillating circuit was required in a reproducing apparatus of battery type.

In the conventional compact apparatus wherein a battery is used, there was a defect that a major part of the power is consumed in the oscillating circuit. This made difficult the utilization of the magnetic transfer method in such small portable apparatus.

BRIEF SUMMARY OF THE INVENTION

Accordingly, a primary object of the present invention is to provide a magnetic recording reproducing apparatus of the magnetic transfer type which eliminates the AC current source, the complicated circuits and the members associated therewith.

Another object of the present invention is to provide a magnetic recording reproducing apparatus of the magnetic transfer type wherein permanent magnet means or DC magnet means is utilized for generating a magnetic transfer field, whereby the AC current source, the complicated circuit and the members associated therewith are eliminated.

A further object of the present invention is to provide a magnetic recording reproducing apparatus for repeatedly reproducing informations such as sounds, images, pulses and the like from a master medium with use of permanent magnet means or DC magnet means as magnetic transfer field generating means, whereby the disadvantages of the conventional repetitive reproducing apparatus are eliminated.

Yet another object of the present invention is to provide a repetitive magnetic recording reproducing apparatus which eliminates the AC power source for generating a magnetic transfer field.

According to the present invention, a magnetic recording reproducing apparatus is provided which comprises magnetic transfer field generating means consisting essentially of mechanically rotating or mechanically oscillating permanent magnet means and/or DC magnet means. More particularly, the present magnetic recording reproducing apparatus comprises a recorded master medium, a unrecorded copy medium, means for advancing said master medium and said copy medium through an area of contact where the magnetic surfaces of both media are brought into contact with each other, means for generating and applying an alternate magnetic field to both media at said area of contact, said means consisting essentially of mechanically rotating or oscillating permanent and/or DC magnet means having a plurality of alternately arranged pole pieces, a magnetic reproducing head for reproducing the transferred signals or informations of the copy medium, and means for driving said copy medium in such manner that any given point on the magnetic surface of the copy medium is repeatedly advanced past said magnetic reproducing head.

Briefly, the characteristic feature of the present invention resides in the use of permanent magnet means and/or DC magnet means as means for generating the necessary magnetic transfer field. The present invention is technically and economically superior to the conventional magnetic recording reproducing apparatus which uses an electromagnet of a high frequency or a commercial frequency (50Hz or 60Hz) primarily because of elimination of oscillating circuit. Further, it is preferable to use the same permanent magnet means or DC magnet means for erasing the copy medium. As already pointed out, the conventional apparatus utilized an AC current source as means for generating the magnetic transfer field, the frequency of which is 50Hz or 60Hz, and the current from such AC current source was passed through a coil mounted on a ring magnetic core provided with a small gap. The magnetic field leaked from the gap was utilized as a transfer field. By suitably designing the circuit for energizing the coil so that the gap is adapted to selectively generate both a magnetic transfer field and an erasing field (the erasing field may be large enough to erase the master medium, if necessary), it was possible that the same magnet core could serve the purpose of erasing the medium, too. In the present invention, too, similar effect is attained.

The advantages resulting from the present invention are, as partly pointed out in the foregoing, elimination of an AC current source for generating a magnetic transfer field and an erasing magnetic field, if necessary, compactness of the apparatus, and provision of a permanent magnetic source for the magnetic transfer field and erasing magnetic field source, if necessary.

The present invention will be fully described in the following explanation in connection with the accompanying drawings.

DETAILED DESCRIPTION OF THE INVENTION

Figure 1:
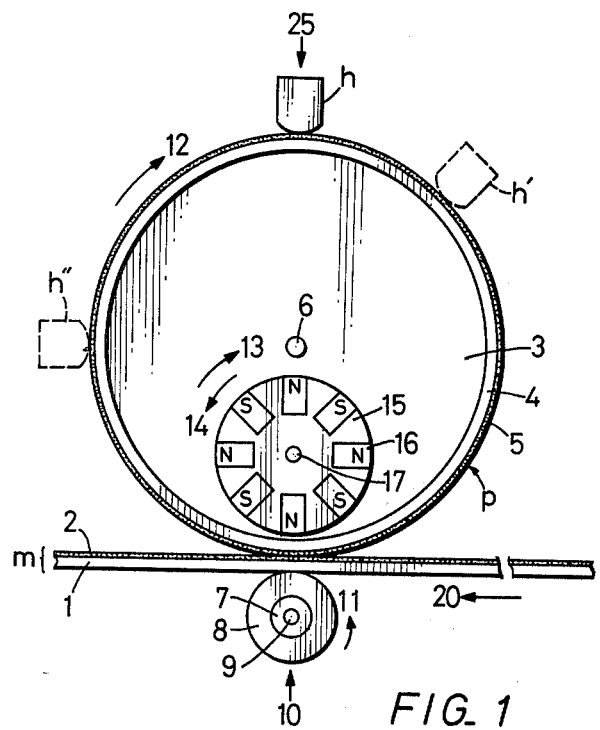
FIG. 1 is an elevational view, partly shown in cross section, illustrating the first embodiment of the present invention.
Figure 3:
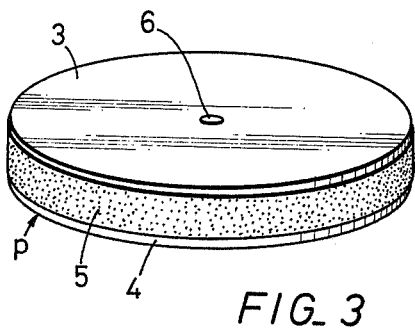
FIG. 3 is a perspective view of the copy medium or magnetic drum illustrated in FIG. 1.
Figure 2:
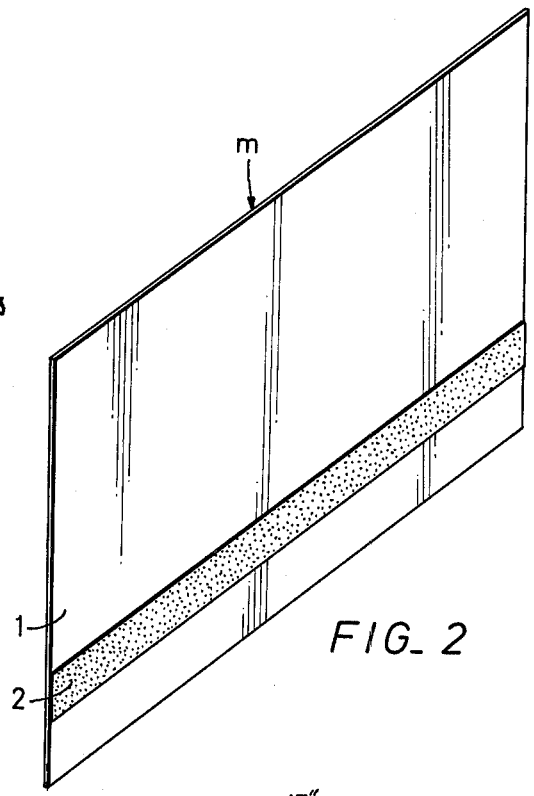
FIG. 2 is a perspective view of the magnetic card illustrated in FIG. 1.

Referring to FIGS. 1, 2 and 3 which illustrate a magnetic recording reproducing apparatus according to the first embodiment of the present invention, a master medium $m$ is illustrated as a sound recorded card or a language training card. The master card $m$ comprises a carrier or substrate 1 formed of paper or a synthetic resin and a magnetic medium 2 on which a sound signal has been recorded. The magnetic medium 2 has a coercive force of about 600 Oe. One surface of the substrate 1 (the rear surface of the card in FIG. 2) has characters, figures and/or pictures such as "DOG", etc. The pronunciations of the characters or the like or an explanation on the characters or the like is recorded on the magnetic medium 2.

Referring to FIG. 1, $p$ is a copy medium which is clearly illustrated in FIG. 3. In FIG. 3, the copy medium $p$ comprises a drum 3 which opens to one side and a magnetic medium 5 formed on the annular periphery 4 of the drum 3. The wall of the drum 3 on the other side is fixedly supported by a shaft 6 which is driven by way of suitable reduction means from an electric motor (not shown) in the direction indicated by an arrow 12. The coercive force of the magnetic medium 5 of the copy medium $p$ is less than that of the magnetic medium 2 of the master medium $m$. For example, it has about 300 Oe. A pinch roller 7 is fixedly mounted on a rotating shaft 9, the axis of which is parallel to the axis of the drive shaft 6. The peripheral surface of the pinch roller 7 is covered with a resilient and frictional material 8 such as rubber, silicone rubber or a plastic material. Referring to FIG. 1, the annular periphery 4 of the drum 3 is opposed to the surface 8 of the pinch roller 7, so that when the master medium $m$ is inserted between the pinch roller 7 and the peripheral surface 4, the master medium $m$ is advanced in the direction shown by an arrow 20. To insure positive engagement of the master medium $m$ with the copy medium $p$, the pinch roller 7 is normally spring biased as indicated with an arrow 10.

The peripheral length of the annular periphery 4 and, accordingly, the length of the magnetic medium 5 should be longer than the length of the magnetic medium 2 on the master medium $m$. The magnetic media 2 and 3 must be brought into contact with each other when the master medium $m$ is inserted between the drum 3 and the pinch roller 7. To this end, there is provided means for guiding the master medium. Such guide means is conventional and hence is not illustrated in the drawings. It will suffice to point out that the guide means provides a transverse control so that the track or magnetic medium 2 is always registered with the track or magnetic medium 5 in the transverse direction.

A reproducing head $h$ is disposed at a location adjacent to the annular periphery 4 of the drum 3 in such manner that the gap portion of the head $h$ engages the magnetic medium 5 under the action of a spring (indicated by an arrow 25). The head $h$ is preferably supported by a movable frame which allows the head to be moved between the position illustrated in FIG. 1 (reproduction period) and a position (not shown) removed from the drum periphery 4 (transfer or printing period or cease period). Additional reproducing heads $h'$, $h''$... may be used, if desired. In such case, reproduced sounds from the plurality of the reproducing heads may be effectively utilized for producing multiple reproduction effect or echo effect, etc.

The inside of the drum 3 is hollow and opens to one side as already described. A magnetic field generating means in the form of a rotary body 15 is provided within the drum 3 as shown in FIG. 1. The rotary body 15 has a plurality of equally spaced permanent magnets 16 having alternate different polarities along its circumferential periphery. Preferably, the permanent magnets 16 are embedded in the peripheral portion of the rotary body 15 in such manner that the longitudinal axis of each of the magnets 16 extends in the radial direction and alternate pole pieces N and S of the magnets 16 sre exposed to the air at the outermost ends. The rotary body 15 is fixedly supported by a central shaft 17 which, in turn, is rotatably supported by a bearing (not shown) on a base (not shown). The shaft 17 is driven by an electric motor (not shown) which may be common to the drive source for the shaft 6 of the drum 3. The direction of rotation of the rotary body 15 is either clockwise as shown by an arrow 13 or counterclockwise as shown by an arrow 14. Alternatively, the rotary body 15 may be oscillated in both directions 13 and 14. The axes of the shaft 17, shaft 6 and the pinch roller 7 are parallel and lie substantially in the same plane, so that the magnetic field generating means and accordingly each pole piece N or S of the permanent magnets 16 applies the maximum magnetic field to the area of contact between the master medium $m$ and the copy medium $p$. Since the peripheral surface of the drum 3 is made from a non-magnetic material such as non-magnetic metal or sunthetic resin, the magnetic field generated from the permanent magnets 16 passes through the drum surface 4.

In operation, insertion of the master medium $m$ between the drum 3 and the pinch roller 7 actuates a suitable start switch (not shown) by engagement of the master medium $m$ with the switch. This places the drum 3 in rotation at a predetermined velocity. For easy understanding of the invention, let us assume that the drum 3 is rotated at a peripheral velocity of 5 cm/sec and the master medium $m$ has a record for a period of time of 5 seconds at a linear velocity of 5 cm/sec (i.e., the length of the record is 25 cm). At the same time, the magnetic field generating means or the rotary body 15 is placed in rotation upon actuation of the start switch in the direction shown by the arrow 13 or 14. The rotational velocity of the rotary body 15 must be so high that the magnetic field successively applied to the area of the contact between the master medium $m$ and the drum surface 4 meets the requirements for the magnetic transfer field as explained before. Preferably, it is convenient to use a common electric motor which is directly connected to the shaft 17 of the rotary body 15 and also is connected through a reduction means to the shaft 6 of the drum 3 to drive the drum at a circumferential velocity of 5 cm/sec. The master medium $m$ is urged against the periphery 4 of the drum 3 and, with the rotation of the drum, is fed in the direction indicated by an arrow 20 at a linear velocity of 5 cm/sec. The magnetic medium 5 of the drum 3 and the magnetic medium 2 of the magnetic medium $m$ are registered by guide means and brought into contact to each other. By selecting the peripheral length of the drum is at least 25 cm, the recorded signal on the whole length of the magnetic medium 2 is magnetically transferred to the magnetic medium 5 of the copy medium $p$. By selecting beforehand the positional relation between the shaft 17 and the contact area between the master medium $m$ and the copy medium $p$ at such a distance that the magnetic field from the permanent magnets 16 at this contact area is just the effective magnetic transfer field, the signal recorded in the magnetic medium 2 can be transferred to the magnetic medium 5 without substantially affecting the recorded signal of the master medium. After the master medium has passed the contact area, the pinch roller 7 is moved in the direction reverse to the arrow 10 so as to remove the pressure on the drum 3.

The shaft 17 of the rotary body 15 is rotatably supported by a bearing block (not shown) which is slidable vertically when viewed in FIG. 1. This bearing block is supported by an elevating mechanism (not shown) which is adapted to automatically move the rotary body 15 together with the bearing block downwardly into position as shown in FIG. 1 when the master medium $m$ is inserted in the apparatus and automatically move the rotary body 15 upwardly into a rest position when the trailing edge of the master medium $m$ clears the pinch roller 7. Accordingly, after the master medium $m$ has cleared the pinch roller 7 the copy medium $p$ will receive little magnetic field.

After the master $m$ has cleared pinch roller 7, the magnetic reproducing head $h$ is brought into contact with the copy medium $p$ (or it may contact the copy medium at all times), while continuing the rotation of the drum 3 in the direction indicated by the arrow 12. The reproducing head $h$ continuously reads out the information or signal recorded on the magnetic medium 5 of the copy medium so long as the drum 3 is being rotated. Thus, the repetitive reproduction of the recorded signal is made possible.

If the operator or user desires to stop or terminate the reproduction from a particular magnetic medium or to reproduce another magnetic medium, he operates a stop switch (not shown) which terminates the repetitive reproduction. This stop switch may be associated with erasing operation or a separate erasing switch may be provided. When the apparatus is set in the erasing operation, the bearing block of the rotary body 15 is automatically moved down to a position where the magnetic field generated from the permanent magnets 16 is sufficiently great to saturate magnetic medium 5 of the copy medium $p$. It is noted that the position of the rotary body 15 is closer to the peripheral surface 4 of the drum 3 than that shown in FIG. 1. Thus, though not illustrated in the drawings, the support for the bearing block for the rotary drum 15 is so constructed that the rotary drum 15 is selectively and automatically positioned in either one of three predetermined positions (i.e., a rest position, a magnetic transfer position and a magnetic erasing position) in response to switch or circuit operation. If desired, the present apparatus may have a function of erasing the master medium $m$. For example, the rotary body 15 can be indexed to another position which is further closer to the peripheral surface of the drum than the above-mentioned erasing position.

From the foregoing, the first embodiment of the present invention has provided a magnetic recording reproducing apparatus wherein transfer and repeated reproduction of signals of a master medium are easily made by utilizing an endless copy medium in the form of a drum and a plurality of rotating permanent magnets disposed within the drum to generate the necessary magnetic transfer field. Further, adjustment of the position of the rotary body with respect to the copy medium makes it possible to utilize the same rotary body as a magnetic transfer field generating means as well as a magnetic erasing field generating means. Further, the erasing field may be adjusted, if desired, so as to adapt it to erasure of both master medium and the copy medium.

The embodiment described above utilizes an elevating mechanism for adjusting the positions of the rotary body bearing a plurality of alternate permanent magnets. Alternatively, instead of changing the position of the rotary body 15, a magnetic shield may be removably inserted between the rotary body 15 and the copy medium $p$. For example, a sheet of a magnetic material of high magnetic permeability such as "Supermalloy", Ni-Zn ferrite, etc.

Figure 4:
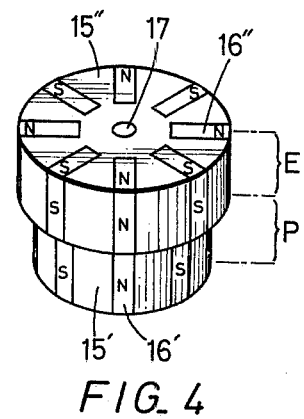
FIG. 4 is a perspective view of an embodiment of a permanent magnet means for generating both magnetic transfer field and magnetic erasing field.

FIG. 4 illustrates another embodiment of a magnetic transfer and erasing field generating means which can be used in the embodiment illustrated in FIG. 1 in place of the rotary body 15 with necessary modifications. The rotary body in FIG. 4 has a fixed axis of rotation instead of the movable axis of the rotary body in FIG. 1. More specifically, the rotary body comprises a magnetic transfer field generating part P and an erasing field generating part E mounted on the same shaft 17. The part P consists of a rotary body 15' provided with a plurality of permanent magnets 16' having uniformly spaced alternate polarities N and S along the circumferential surface of the rotary body 15'. The part E consists of a rotary body 15" having a similar construction to the rotary body 15' but having a larger diameter than the rotary body 15'. The rotary body 15" has a plurality of permanent magnets 16". The assembly in FIG. 4 is used in place of the rotary body 15 in FIG. 1 with obvious change or modification. The shaft 17 is adapted to be moved in its axial direction with a suitable indexing mechanism (not shown) in such manner that either one of the rotary body 15' and the rotary body 15" is selectively registered with the position of the magnetic medium 5 of the copy medium p, or the assembly can be entirely removed from the position of the magnetic medium 5. It is to be noted that the positional relationship between the rotary bodies 15', 15" and the magnetic medium 5 of the copy medium p, the strength of the permanent magnets, the number of magnets and the rotational speed of the rotary bodies are preselected so as to apply the necessary magnetic fields for magnetic transfer and erasure at the area of contact between the master medium and the copy medium.

The rotary bodies 15, 15', 15" in the foregoing embodiments were illustrated as having eight pole pieces N and S in total exposed to the air. Taking an example, assuming that these rotary bodies are directly driven by an electric motor of 1500 RPM, the permanent magnets generate an alternating magnetic field of 100Hz (1500 RPM $\times$ 8 /60 sec $\times$ 2). Permanent magnets formed from samarium-cobalt (Sm Co$_5$), cobalt ferrite (CoFe$_2$O$_4$), anisotropical barium-cobalt, barium ferrite (BaO·6Fe$_2$O$_3$), Alnico or the like easily generate the required magnetic fields. For example, a permanent magnet produced from samarium-cobalt will have a field strength of 2,750 Gauss at the end surface of the pole piece, 1,700–2,000 Gauss at a distance of 0.5 mm from the end surface, 1,000–1,200 Gauss at a distance of 1.0 mm, and 250–300 Gauss at a distance of 3.0 mm. Accordingly, this material can be used for the permanent magnets for the rotary bodies of the present invention, since it generates a magnetic field of sufficient strength as the magnetic transfer field and the erasing field for ordinary master media and copy media. It has been confirmed that the 100 Hz alternate magnetic field was sufficient for magnetic transfer from a master medium m to a copy medium p, both of which are being advanced at a velocity of 5 cm/sec. For erasure, it is generally preferable to use a higher frequency than the magnetic transfer field. This can be easily attained by increasing the number of the permanent magnets 16" supported by the rotary body 15" in the case of the embodiment in FIG. 4.

Figure 5:
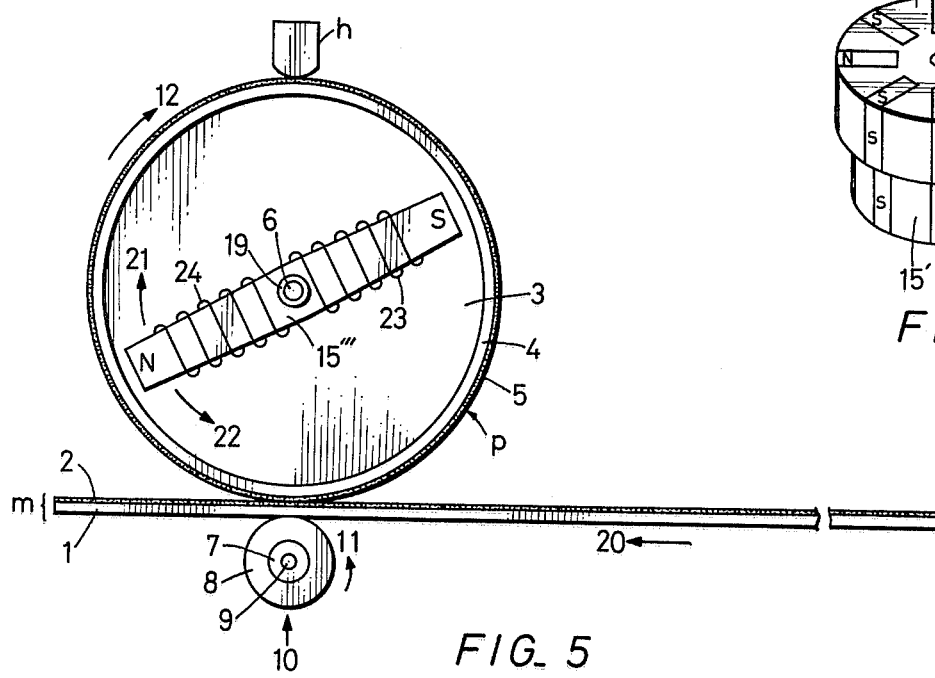
FIG. 5 is an elevational view of the second embodiment of the present invention, partly shown in cross section.

Another embodiment of the present invention is illustrated in FIG. 5 in which elements or parts similar to those in FIG. 1 are indicated by the same reference numerals, a detailed explanation of which will be omitted. The feature of this embodiment resides in the fact that the transfer field and the erasing field are generated from a combination of at least one permanent magnet and at least one DC electromagnet. For the simplicity of explanation, this embodiment is described as comprising a rotary body consisting of a single bar permanent magnet having N and S poles plus a DC winding. More specifically, a rotary body 14''' comprising a permanent magnet is supported at 19 by the drive shaft 6. The rotary body 15''' is driven from the shaft 6 at a high rotational velocity in the direction indicated by 21 or 22 for generating a required alternate magnetic field at the contact area of the copy medium with the master medium. The rotary body 15''' is provided with a pair of coils or windings 22 and 23 which have a direction of winding to strengthen the magnetic field at the pole pieces N and S upon passage of a DC current. In other words, the magnetic field from the DC windings 22, 23 is superposed on the magnetic field generated by the permanent magnet and thus two types of magnetic field are generated in response to energization and deenergization of the DC windings 22 and 23.

That is, when DC current is not passed through the windings, the alternate magnetic field generated by the pole pieces of the rotating permanent magnet or the rotary body 15''' has a field strength required for magnetic transfer of signals from the master medium m to the copy medium p. On the other hand, when the DC current is passed through the windings 22, 23, the magnetic field from the permanent magnet is strengthened by the DC magnetic field to provide a field strength required for magnetic erasure of the copy medium p or both the copy medium and the master medium p. Alternatively, the DC current to be applied to the DC windings may be reversed to weaken the magnetic field of the permanent magnet and the strength of the permanent magnet may be set at a higher value than in the above case. Thus, the magnetic field without passage of DC current is used for magnetic erasure while the magnetic field with passage of DC current is used for transfer field.

According to the present embodiment, advantages are obtained that magnetic fields required for both magnetic transfer and erasure can be easily generated merely by superposing a small DC magnetic field on the magnetic field of relatively great strength, that there is no need of relying on any mechanical positioning or indexing means for the switching between the different types of magnetic fields, and that economical use of a DC electric source is attained.

Although the embodiments of the present invention have been described with reference to the copy medium in the form of drum, it should be understood that the copy medium may be in the form of a tape. Further, the rotary type permanent magnet (or DC magnet) for generating magnetic transfer field and erasing field may be provided on the side of the pinch roller illustrated in the drawings, instead of installing it within the drum. Further, the magnetic field generating means may be separate for the magnetic transfer and the erasure. Also, the rotary bodies may be oscillated instead of being rotated.

The present invention has been fully described in connection with preferred embodiments but it should be understood that a person skilled in the art can easily infer a modification or revision within the scope of the following claims.

What we claim is:

1. A magnetic recording reproducing apparatus comprising:
   a predetermined length of master medium having a magnetic surface with recorded information thereon and adapted to be inserted in the apparatus;
   an endless copy medium having a magnetic surface for temporarily storing the recorded informations from said master medium;
   guide means for bringing the master medium and the copy medium into contact at their magnetic surfaces;
   field generating means positioned within said copy medium for applying at the contact area an alternate magnetic transfer field, said field generating means consisting essentially of an arrangement of alternate N and S pole pieces of at least one permanent or DC magnet which is mechanically oscillated or rotated;
   means for selectively moving said field generating means into a first position capable of applying the magnetic transfer field to the area of contact upon insertion of said master medium into the apparatus whereby said recorded information is transferred to said copy medium and for moving said field generating means from said first position to a second position at which recorded information is not transferred to said copy medium; and
   reproducing head means for repeatedly reading out the temporarily recorded informations of the copy medium.

2. A magnetic recording reproducing apparatus as claimed in claim 1, wherein said magnetic surface of said master medium has a coercive force greater than that of the magnetic medium of said copy medium, and the strength of the magnetic transfer field is such that the recorded informations of the master medium are transferred to said copy medium without substantially destroying the recorded informations of the master medium.

3. A magnetic recording reproducing apparatus as claimed in claim 1, wherein said copy medium is in the form of a rotating drum and the magnetic medium of the copy medium is formed on the outer periphery of said drum.

4. A magnetic recording reproducing apparatus as claimed in claim 1, wherein said field generating means comprises a rotary body provided with at least a pair of N and S pole pieces on its periphery.

5. A magnetic recording reproducing apparatus as claimed in claim 4 wherein said pole pieces are those of at least one permanent magnet embedded in said rotary body.

6. A magnetic recording reproducing apparatus comprising:
   a predetermined length of master medium having a magnetic surface which bears recorded informations and adapted to be inserted in the apparatus;
   an endless copy medium having a magnetic surface for temporarily storing the recorded informations from said master medium;
   guide means for bringing the master medium and the copy medium into contact at their magnetic surfaces;
   transfer field generating means positioned within said copy medium for applying at the contact area an alternate magnetic transfer field, said field generating means consisting essentially of an arrangement of alternate N and S pole pieces of at least one permanent or DC magnet which is mechanically oscillated or rotated;
   erasing field generating means for applying an alternate magnetic/erasing field to the copy medium or both the copy medium and the master medium, said erasing means consisting essentially of an arrangement of alternate N and S pole pieces of at least one permanent or DC magnet which is mechanically oscillated or rotated;
   means for selectively moving said transfer field generating means and said erasing field generating means into positions capable of applying respective magnetic fields to the master medium and the copy medium; and
   reproducing head means for repeatedly reproducing the temporarily recorded informations of the copy medium.

7. A magnetic recording reproducing apparatus as claimed in claim 6, wherein said transfer field generating means and said erasing field generating means are in the form of a rotary body and said alternate N and S pole pieces are provided along the outer periphery of the rotary body.

8. A magnetic recording reproducing apparatus as claimed in claim 7, wherein said transfer field generating means and said erasing field generating means are a unitary rotary body, and means for selectively positioning the axis of said rotary body between the transfer field generating position and erasing field generating position, said erasing field generating position being closer to said contact area than said field generating position, said positioning means being a slideable support for the axis of said rotary body and being movable substantially perpendicular to said axis.

9. A magnetic recording reproducing apparatus as claimed in claim 7, wherein said transfer field generating means and said erasing field generating means are distinct rotary bodies fixedly mounted on a common shaft and means for axially moving the shaft to selectively position one of said rotary bodies with respect to said area of contact.

10. A magnetic recording reproducing apparatus comprising:
    a predetermined length of master medium having a magnetic surface which bears recorded informations and adapted to be inserted in the apparatus;
    an endless copy medium having a magnetic surface for temporarily storing the recorded informations from said master medium;
    guide means for bringing the master medium and the copy medium into contact at their magnetic surfaces;
    transfer field generating means positioned within said copy medium for applying at the area of contact an alternate magnetic transfer field, said field generating means consisting essentially of an arrangement of alternate N and S pole pieces of at least one permanent or DC magnet which is mechanically oscillated or rotated;
    erasing means for applying an alternate magnetic/erasing field to the copy medium; and
    said transfer field generating means and said erasing means being a common arrangement of alternate N and S pole pieces of at least one permanent magnet and a DC winding mounted on the permanent magnet, whereby the field strength at the contact area of the master medium and the copy medium is switched between the two types of magnetic fields upon energization and de-energization of the DC winding.

* * * * *